Oct. 14, 1958   J. A. AMORI   2,856,073
SUSPENSION AND CONTROL MECHANISM FOR SHAKER TABLE
Filed Jan. 14, 1957   2 Sheets-Sheet 1
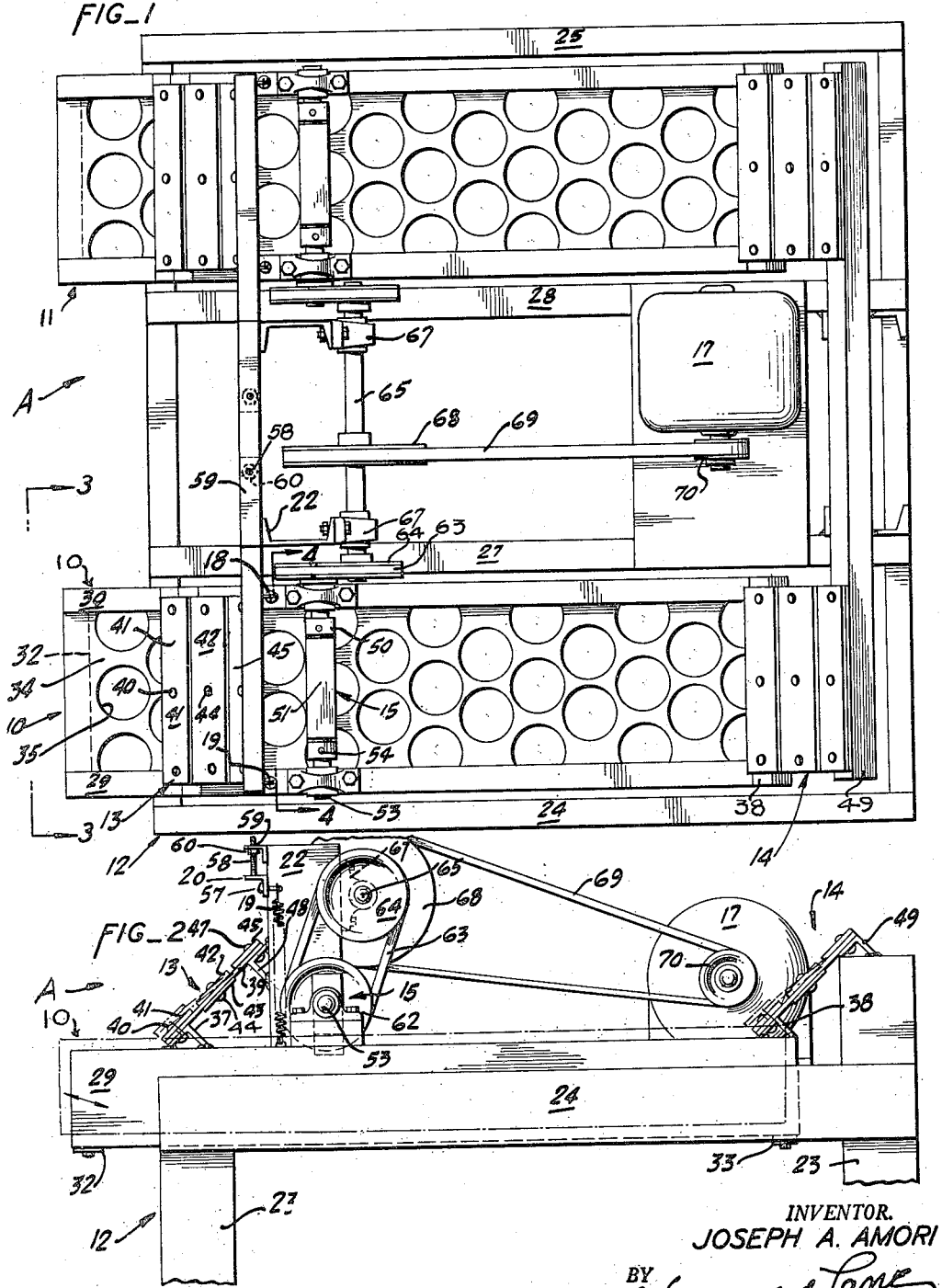
INVENTOR.
JOSEPH A. AMORI
BY
ATTORNEYS Oct. 14, 1958   J. A. AMORI   2,856,073
SUSPENSION AND CONTROL MECHANISM FOR SHAKER TABLE
Filed Jan. 14, 1957   2 Sheets-Sheet 2
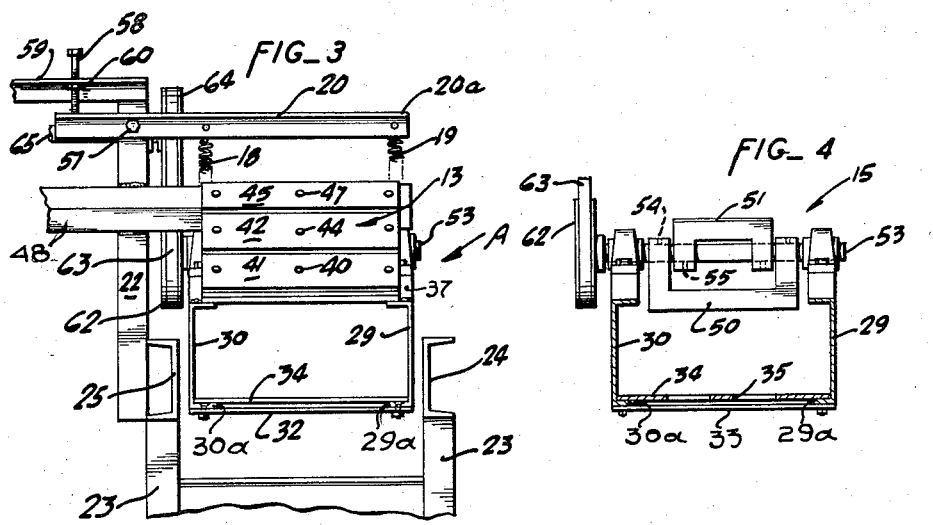
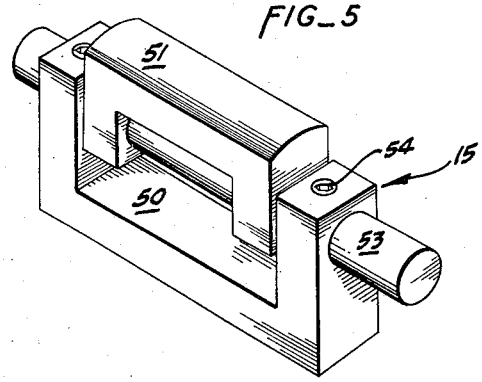
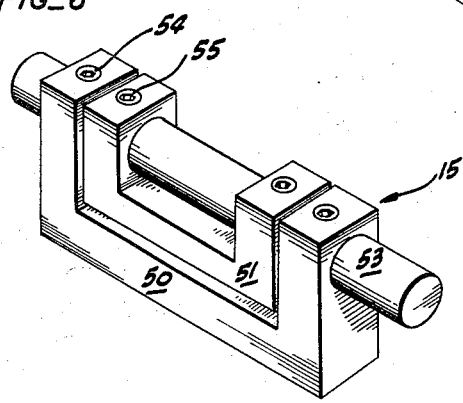
INVENTOR.
JOSEPH A. AMORI
ATTORNEYS

United States Patent Office 2,856,073
Patented Oct. 14, 1958

2,856,073

SUSPENSION AND CONTROL MECHANISM FOR SHAKER TABLE

Joseph A. Amori, San Jose, Calif.

Application January 14, 1957, Serial No. 634,050

8 Claims. (Cl. 209—415)

The present invention relates to material handling apparatus, and pertains more particularly to suspension and control mechanism for a shaker table to be used in the handling and grading of fruit and vegetables.

In the fruit and vegetable processing industries it is common practice to employ a vibrating or oscillating table commonly called a "shaker table," for grading, erecting, or otherwise processing fruit as it is fed along through the machine.

The present invention contemplates the provision of improved mounting and control means for a fruit and vegetable processing shaker table.

The invention also provides simple and positive means for actuating and controlling the vibratory movements of a shaker table.

A further object of the invention is to provide improved means for controlling the force and amplitude of the vibrations or oscillations of a fruit processing shaker table.

These, and other objects of the invention, will be apparent from the following description and the accompanying drawings, wherein Fig. 1 is a plan view of a two-unit shaker table embodying the present invention.

Fig. 2 is a side elevational view of the shaker table shown in Fig. 1, portions being broken away.

Fig. 3 is a fragmentary end elevational view taken in the direction of the arrow 3—3 of Fig. 1.

Fig. 4 is a fragmentary sectional view taken along line 4—4 of Fig. 1.

Fig. 5 is an enlarged, perspective view of a pair of rotatively adjustable, gyratory, eccentric weight members mounted in rotatively adjusted relation on a supporting shaft to provide a minimum oscillating effect on the shaker member.

Fig. 6 is a view similar to Fig. 5, but showing the weights adjusted to provide a maximum oscillating effect.

Briefly, the illustrated embodiment of the invention comprises a double unit shaker table A, having a pair of similar shaker members 10 and 11 supported from a stationary frame 12 by a pair of similar suspension members 13 and 14. Since both shaker members 10 and 11 are substantially identical, only the lower one 10 as shown in Fig. 1 will be described herein.

The shaker member 10 has an eccentric weight drive unit 15 rotatively mounted thereon to provide adjustable gyratory drive means therefor. The drive unit 15 is driven by a motor 17 to rotate at a desired speed. The amplitude and severity of the oscillations of the shaker member 10, under the action of its drive unit 15, is controlled by a pair of springs 18 and 19 (Fig. 3) mounted in adjusted tension between the shaker member 10 and a control lever 20 pivoted on an upright frame member 22.

Referring to the drawings in detail, the stationary mounting frame 12 includes support legs 23, longitudinal channel frame members 24 and 25 and intermediate longitudinal channel frame members 27 and 28.

The shaker member 10 comprises a pair of inwardly facing, channeled side members 29 and 30, secured together at their ends by transverse bottom strips 32 and 33 (Figs. 2 and 3). A perforated, fruit sizing bottom plate 34, having a plurality of openings 35 therein of a predetermined diameter is removably mounted on the inwardly facing lower flanges 29a and 30a of the channel side members 29 and 30.

A pair of angle iron cross members 37 and 38 (Fig. 2) are secured, apex upward, transversely across the upper sides of the channel side members 29 and 30, the forward one 38 being mounted at the forward end of the shaker member 10, and the rearward one 37 being mounted in inwardly spaced relation to the rear end thereof.

The two suspension members 13 and 14 are identical to each other, so only the left hand one 13 as shown in Fig. 1 will be described herein.

The suspension member 13 comprises a short length of conventional, wide, canvas reinforced rubber belting material 39. The lower edge of the belting 39 is attached to the rear angle iron transverse member 37 by rivets 40, which also secure a stiffening batten 41 transversely over the lower end portion of the belting 39.

A pair of medial stiffening battens 42 and 43 also are secured, by rivets 44, to opposite sides of the central portion of the belting 39. The medial battens 42 and 43 are spaced edgewise from the lower batten 41 to permit hinged flexing of the belting 39 between the medial battens 42 and 43 and the lower batten 41.

The upper end of the belting 39, together with an upper stiffening batten 45, are secured by rivets 47 to an upper angle iron frame member 48 secured transversely of the upright frame members 22 (Figs. 1, 2 and 3).

The front suspension member 14 is similar to the rear suspension member 13, and is mounted similarly thereto between the lower angle iron cross member 38 on the shaker member 10, and an upper, transversely extending, angle iron frame member 49 (Figs. 1 and 2).

The gyratory drive unit 15 for the shaker member 10 comprises two U-shaped, eccentric weight members 50 and 51, secured in rotatively adjusted position on a rotary shaft 53 by socketed set screws 54 and 55, respectively.

The eccentric weight members 50 and 51 may be adjusted rotatively on their common support shaft 53 to any desired relative rotative position upon loosening their set screws 54 and 55, from a position of minimum total eccentricity shown in Fig. 5 to a position of total maximum eccentricity shown in Fig. 6. Intermediate relative rotative adjustment of the two weight members 50 and 51 between these two positions of Figs. 5 and 6 obviously will provide eccentric driving forces of varying intensity.

For partially supporting the weight of the shaker member 10 and any fruit which may be thereon, and for biasing the shaker member 10 rearwardly toward the position thereof shown in Figs. 1 and 2, the suspension springs 18 and 19 are mounted in tension between the shaker member 10 just forwardly of the rear suspension member 13 and the angle iron adjusting lever 20, which is pivoted on a bolt 57 (Fig. 3) to the upright frame member 22, and extends therefrom laterally outwardly above the shaker member 10. The spring support lever 20 is held in adjusted position against the tension of the springs 18 and 19 by an adjusting screw 58, which is screwed into a threaded hole provided therefor in an angle iron member 59 mounted transversely across the upper ends of the upright frame members 22.

A lock nut 60 is provided on the screw 58 to secure it in adjusted position. By screwing the screw 58 downwardly, the inner end of the adjusting lever 20 will be depressed, and the outer portion 20a thereof beyond the pivot 57 will be raised to increase the tension on the springs. Conversely, upward screwing of the screw 58 will slacken these springs.

For driving the eccentric weight supporting shaft 53, a grooved pulley 62 is secured to the inner end of the shaft 53 and is driven by a V-belt 63 from a pulley 64 secured to a jack shaft 65 journaled in bearings 67 on the forward edges of the upright frame members 22.

A second grooved pulley 68 is also secured to the jack shaft 65, and is driven by a V-belt 69 from a pulley 70 on the drive motor 17.

In using the illustrated mechanism A, a supply of fruit, for example peaches (not shown), is fed into the forward end of each shaker member 10 and 11 with the motor 17 running and the eccentric weights 50 and 51 adjusted to desired relative rotative positions on the shaft 53.

Rotation of the shaft 53 by the motor 17 through the drive belts 63 and 69, pulleys 62, 64, 68 and 70 and the jack shaft 65, exerts a gyratory driving force on the shaker members 10 and 11. This gyratory force is changed by the action of the suspension members 13 and 14 and the springs 18 and 19 into an oscillatory movement which tends to throw the fruit on the shaker members upwardly and rearwardly in a series of short jumps which causes the fruit to be partially rotated at each oscillation of the shaker member and thus to find its way through any of the holes 35 in the bottom plate 34 of a size to receive it. By increasing the tension on the springs 18 and 19 the strokes of the shaker member 10 or 11 may be made shorter and sharper, while decreasing the tension on these springs causes a longer less violent type of stroke.

During the progress of the fruit (not shown) along the shaker members 10 and 11, the fruit of smaller diameter than the holes 35 will fall therethrough, while the larger fruit will proceed onwardly through the entire length of the shaker member and will be discharged from its rearward end in a usual manner.

The bottom plate 34 may be interchanged with other bottom plates (not shown) having different sizes of holes therein, or of desired different configuration as required to perform a desired result on fruit to be processed therein. These substitutions are well known, and since they are not a feature of the invention, they will not be described herein.

The suspension and control arrangement for the shaker table is simple, sturdy and inexpensive, and provides for easy and accurate control of the force and amplitude of the oscillations thereof so as to provide a driving effect suitable for a wide range of operations.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. A suspension and control mechanism for a shaker table comprising, in combination with a frame and a shaker unit having an intake end and a discharge end; a pair of suspension members connecting the shaker unit adjacent each end thereof to a frame element spaced upwardly therefrom, each suspension member comprising a length of flexible sheet material, means stiffening the medial portion of each suspension member to limit flexing of the suspension members to portions thereof above and below their stiffened medial portions, spring means acting inwardly on the shaker unit to thereby partially support the weight of the shaker table and to incline the suspension members away from the vertical, means for adjusting the force of said spring acting on the shaker unit, thereby to change the angle of inclination of the suspension members and to vary the distribution of the weight of the shaker unit between the spring means and the suspension members, gyratory weight means mounted eccentrically of its axis on the shaker unit, and drive means operatively connected rotatively to drive the gyratory weight means, thereby to oscillate the shaker unit on its suspension members, whereby adjustment of the tension of the spring controls the amplitude and severity of the oscillations of the shaker unit.

2. A suspension and control mechanism for a shaker table comprising in combination with a frame and a shaker unit having an intake end and a discharge end; a pair of suspension members connecting the shaker unit adjacent each end thereof to a frame element spaced upwardly therefrom, each suspension member comprising a length of flexible sheet material, a pair of stiffening battens secured to opposite sides of the medial portion of each such length of sheet material to prevent flexing of such medial portions, said battens being spaced slightly from the frame and from the shaker unit to provide flexible hinging zones therebetween, a spring secured in tension between a point on the shaker unit adjacent its discharge end and a frame element spaced upwardly therefrom, said frame being disposed at such an angle and of such strength as to incline the suspension members at an acute angle to the vertical with their lower ends offset toward the discharge end of the shaker unit, means for adjusting the tension on said spring, a gyratory weight mounted eccentrically of its axis on the shaker unit adjacent said spring, and drive means operatively connected to drive the gyratory weight to oscillate the shaker unit on its suspension members, whereby adjustment of the tension of the spring controls the amplitude and severity of the oscillations of the shaker unit.

3. A suspension and control mechanism for a shaker table comprising, in combination with a frame and a shaker unit having an intake end and a discharge end; a pair of suspension members connecting the shaker unit adjacent each end thereof to a frame element spaced upwardly therefrom, each suspension member comprising a length of flexible sheet material, a pair of stiffening battens secured to opposite sides of the medial portion of each such length of sheet material to prevent flexing of such medial portion, said battens being spaced slightly from the frame and from the shaker unit to provide flexible hinging zones therebetween, spring means acting on the shaker unit with sufficient strength and at such an angle as to elevate the shaker unit and move it toward its discharge end from a normal suspended condition, means for adjusting the force of said spring on the shaker table, and drive means operatively connected to oscillate the shaker unit on its suspension members, whereby adjustment of the force of the spring on the shaker unit controls the amplitude and severity of the oscillations of the shaker unit.

4. A suspension and control mechanism for a shaker table comprising, in combination with a frame and a shaker unit having an intake end and a discharge end; a pair of substantially parallel suspension members connecting the shaker unit adjacent each end thereof to a frame element spaced upwardly therefrom, each suspension member comprising a length of flexible sheet material, means stiffening the medial portion of each suspension member to limit flexing of the suspension members to portions thereof above and below their stiffened medial portions, spring means acting upwardly on the shaker unit at an acute angle to the suspension units, thereby to partially support the weight of the shaker unit and to incline the suspension members away from the vertical, means for adjusting the force of said spring, and drive means mounted to oscillate the shaker unit on its suspension members, whereby adjustment of the tension of the spring controls the amplitude and severity of the oscillations of the shaker unit.

5. A suspension and control mechanism for a shaker table comprising, in combination with a frame and a shaker unit having an intake end and a discharge end; a pair of suspension members connecting the shaker unit adjacent each end thereof to a frame element spaced upwardly therefrom, each suspension member comprising a length of flexible sheet material, means stiffening the medial portion of each suspension member to limit flexing of the suspension members to portions thereof above and below their stiffened medial portions, substantially upright spring means secured in tension between the discharge end only of the shaker unit and a frame element spaced upwardly therefrom, thereby partially supporting the shaker unit and inclining the suspension members away from the vertical, means for adjusting the tension on said spring, and drive means mounted on the discharge end of the shaker unit to oscillate the shaker unit on its suspension members, whereby adjustment of the tension of the spring controls the angle of inclination of the suspension members and the amplitude and severity of the oscillations of the shaker unit.

6. A suspension and control mechanism for a shaker table comprising, in combination with a frame and a shaker unit having an intake end and a discharge end; a pair of suspension members connecting the shaker unit adjacent each end thereof to a frame element spaced upwardly therefrom, each suspension member comprising a length of rubber belting, a pair of battens secured one to each face of the medial portion of the belting for stiffening the medial portion of each suspension member to limit flexing of the suspension members to portions thereof above and below their stiffened medial portions, spring means secured in tension between the shaker unit and a frame element spaced upwardly therefrom, means for adjusting the tension on said spring, gyratory weight means mounted eccentrically of its axis on the shaker unit, and drive means operatively connected rotatively to drive the gyratory weight means, thereby to oscillate the shaker unit on its suspension members, whereby adjustment of the tension of the spring controls the amplitude and severity of the oscillations of the shaker unit.

7. A suspension and control mechanism for a shaker table comprising, in combination with a frame and a shaker unit having an intake end and a discharge end; a pair of suspension members connecting the shaker unit adjacent each end thereof to a frame element spaced upwardly therefrom, each suspension member comprising a stiff medial portion and hinged end connections to the frame and shaker unit, respectively, spring means acting upwardly on the shaker unit to thereby partially support the weight of the shaker unit and to incline the suspension members away from the vertical, means for adjusting the force of said spring acting on the shaker unit, thereby to change the angle of inclination of the suspension members and to vary the distribution of the weight of the shaker unit between the spring means and the suspension members, gyratory weight means mounted eccentrically of its axis on the shaker unit, and drive means operatively connected rotatively to drive the gyratory weight means, thereby to oscillate the shaker unit on its suspension members, whereby adjustment of the tension of the spring controls the amplitude and severity of the oscillations of the shaker unit.

8. A suspension and control mechanism for a shaker table comprising, in combination with a frame and a shaker unit having an intake end and a discharge end; a pair of suspension members connecting the shaker unit adjacent each end thereof to a frame element spaced upwardly therefrom, each suspension member comprising a stiff medial portion and hinged end connections to the frame and shaker unit, respectively, spring means acting upwardly on the shaker unit adjacent the discharge end only of the shaker unit to thereby partially support the weight of the shaker unit and to incline the suspension members away from the vertical, means for adjusting the force of said spring acting on the shaker unit, thereby to change the angle of inclination of the suspension members and to vary the distribution of the weight of the shaker unit between the spring means and the suspension members, gyratory weight means mounted eccentrically of its axis on the shaker unit and adjacent the discharge end thereof, and drive means operatively connected rotatively to drive the gyratory weight means, thereby to oscillate the shaker unit on its suspension members, whereby adjustment of the tension of the spring controls the amplitude and severity of the oscillations of the shaker unit.

References Cited in the file of this patent
UNITED STATES PATENTS 2,183,660    Symons _____ Dec. 19, 1939

FOREIGN PATENTS 598,276    France _____ Sept. 26, 1925